(12) United States Patent
Melhorn et al.

(10) Patent No.: US 8,726,848 B2
(45) Date of Patent: May 20, 2014

(54) POULTRY CART HANDLER AND METHOD

(76) Inventors: J. Michael Melhorn, Mount Joy, PA (US); David S. Becker, Elizabethtown, PA (US)

( * ) Notice: Subject to any disclaimer, the term of this patent is extended or adjusted under 35 U.S.C. 154(b) by 646 days.

(21) Appl. No.: 13/093,899

(22) Filed: Apr. 26, 2011

(65) Prior Publication Data

US 2012/0272925 A1  Nov. 1, 2012

(51) Int. Cl.
 *B66F 9/10* (2006.01)
 *B66F 9/06* (2006.01)

(52) U.S. Cl.
 CPC .................................... *B66F 9/06* (2013.01)
 USPC ........................................... 119/843; 414/664

(58) Field of Classification Search
 CPC ..................................... B60P 3/04; B66P 9/06
 USPC ................. 119/401, 406, 407, 414, 415, 843; 414/621, 631, 659, 660, 664, 665–667
 See application file for complete search history.

(56) References Cited

U.S. PATENT DOCUMENTS

| | | | | |
|---|---|---|---|---|
| 2,605,918 | A | * | 8/1952 | Roscoe ........................ 414/665 |
| 2,621,821 | A | * | 12/1952 | Melin ........................... 414/665 |
| 3,272,364 | A | | 9/1966 | Mindrum et al. |
| 3,470,852 | A | | 10/1969 | Bright |
| 3,672,526 | A | * | 6/1972 | Hansen ......................... 414/666 |
| 3,762,588 | A | * | 10/1973 | Hansen et al. ................ 414/666 |
| 4,354,795 | A | | 10/1982 | Dutra, Jr. |
| 4,365,591 | A | | 12/1982 | Wills et al. |
| 4,380,969 | A | | 4/1983 | Thomas |
| 4,510,886 | A | | 4/1985 | van Mill |
| 4,636,131 | A | * | 1/1987 | Sinclair ......................... 414/621 |
| 5,388,948 | A | | 2/1995 | Jerome |
| 5,411,361 | A | * | 5/1995 | Neri et al. ..................... 414/664 |
| 5,476,353 | A | | 12/1995 | Mola |
| 5,584,363 | A | * | 12/1996 | Curtin et al. .................. 187/243 |
| 5,660,147 | A | | 8/1997 | Wills et al. |
| 5,735,664 | A | | 4/1998 | Jerome |
| 5,882,176 | A | | 3/1999 | Marcoux |
| 5,913,655 | A | | 6/1999 | Maday |
| 6,109,215 | A | | 8/2000 | Jerome |
| 6,347,604 | B1 | | 2/2002 | Lapere et al. |
| 6,564,752 | B2 | | 5/2003 | Jerome |
| 6,612,918 | B2 | | 9/2003 | Livingston et al. |
| 6,623,232 | B2 | | 9/2003 | Cattaruzzi |
| 6,835,900 | B2 | | 12/2004 | Jones |
| 6,851,389 | B2 | | 2/2005 | Giordano et al. |
| 7,500,448 | B1 | | 3/2009 | Melhorn |
| 8,376,089 | B2 | * | 2/2013 | Stone ............................ 187/232 |
| 2008/0302309 | A1 | | 12/2008 | Herman |

* cited by examiner

*Primary Examiner* — Rob Swiatek
*Assistant Examiner* — Danielle Clerkley
(74) *Attorney, Agent, or Firm* — Howson & Howson LLP

(57) ABSTRACT

A cart-handler for mobile carts within narrow confines is provided. The cart-handler is constructed from an elongate frame having at least one upright support rail and opposite ends supported on wheels. A pair of stabilizers is connected to the frame with each stabilizer being movable into a retracted position on the frame and into a laterally-extended position in which the stabilizer directly engages an underlying floor surface to aid in supporting the cart-handler on the floor. When the stabilizers are placed in the laterally-extended position, each stabilizer extends outward from a common side of the elongate frame. A cart-lifter is mounted on the support rail of the frame and is movable vertically along the support rail so that the cart-lifter can engage, elevate, and support a separate mobile cart above the underlying floor surface. The cart-handler can be interconnected to a pair of elevated mobile work platforms.

16 Claims, 10 Drawing Sheets

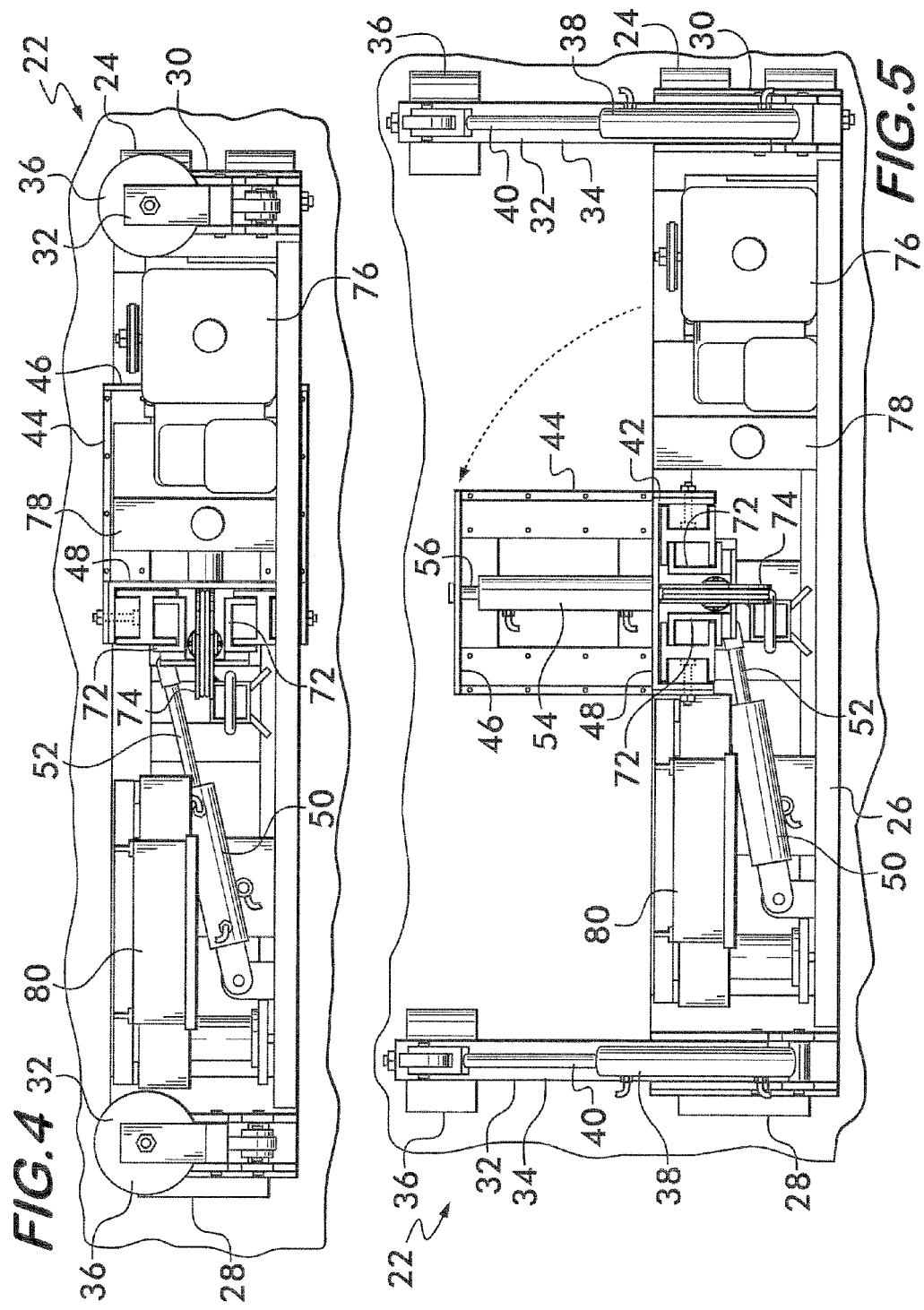

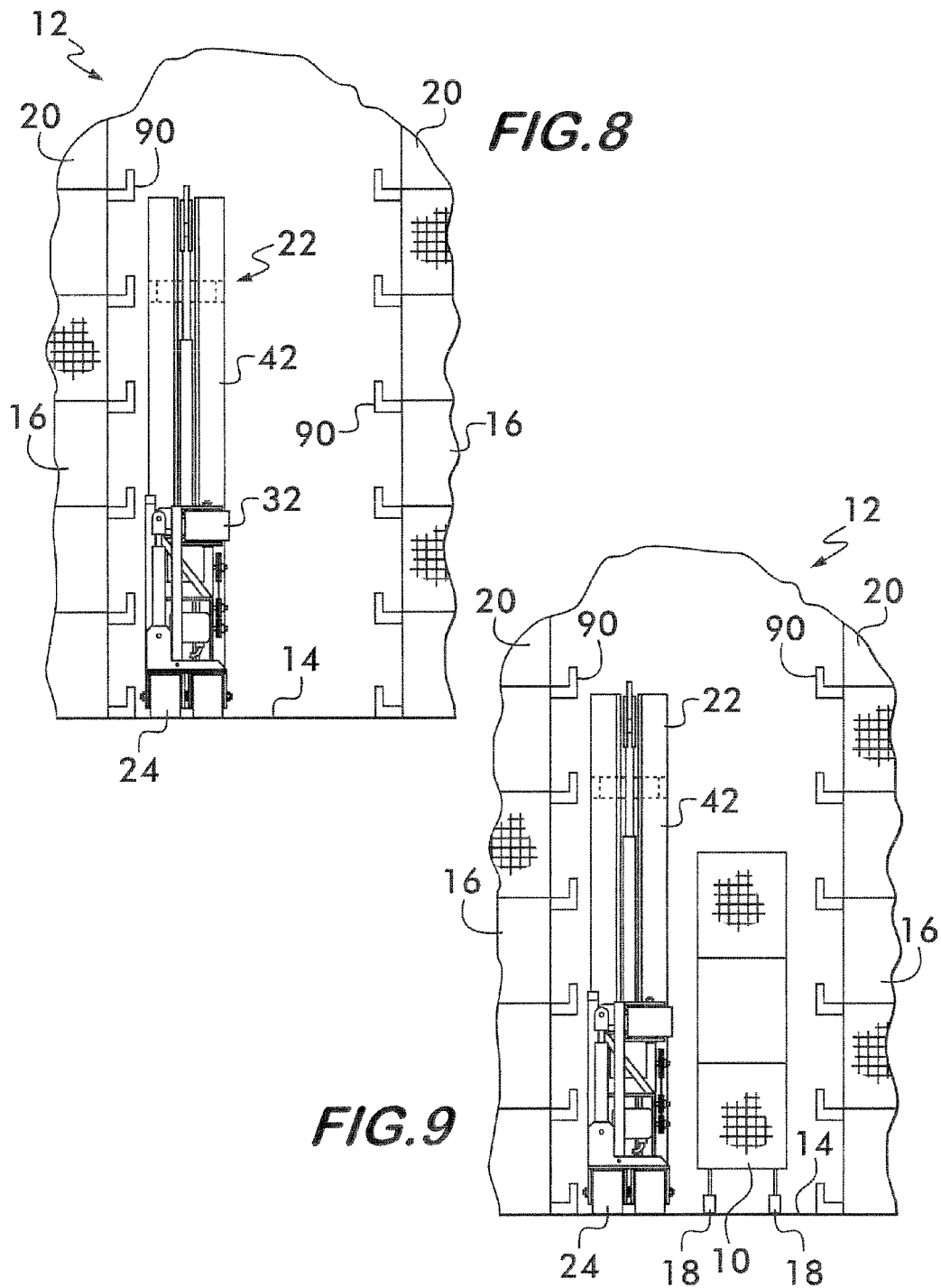

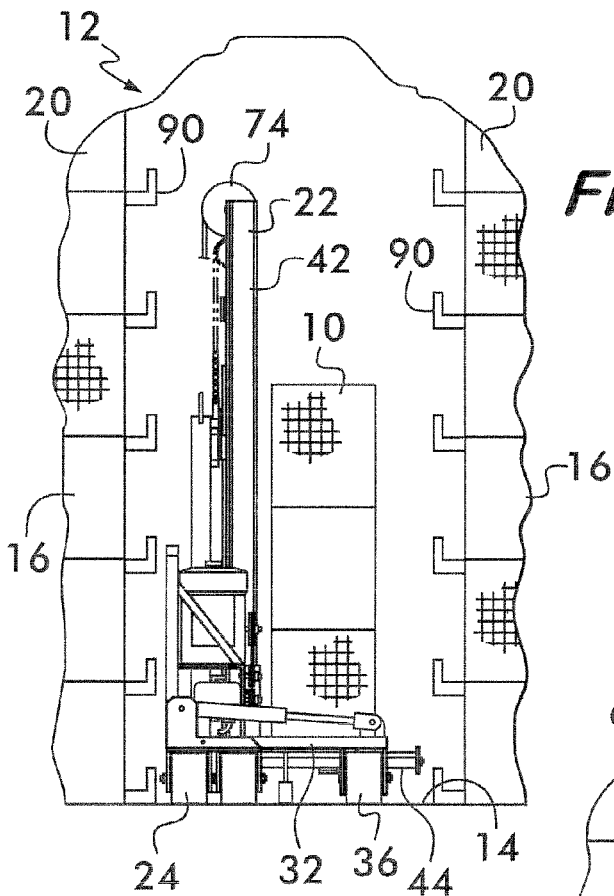
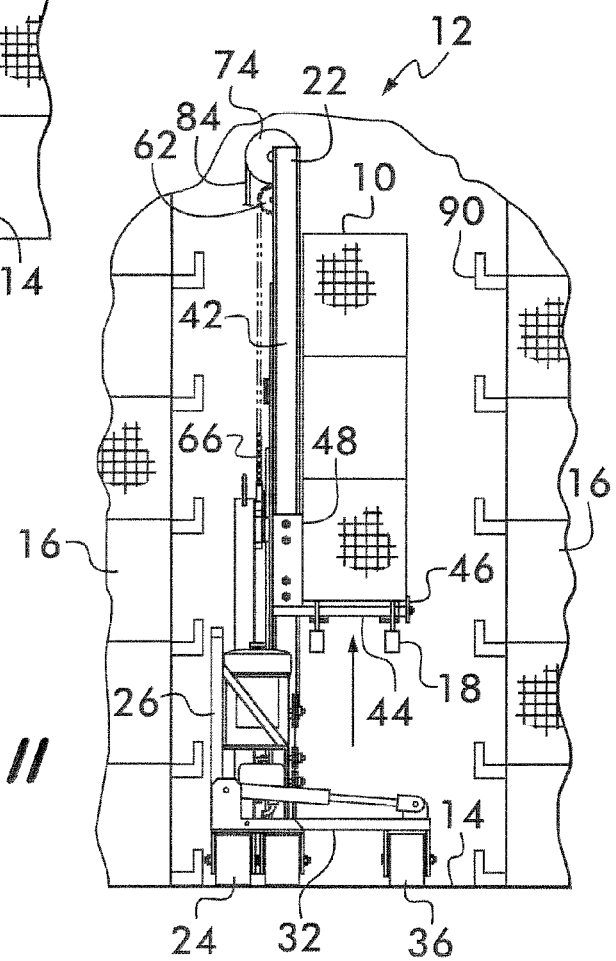

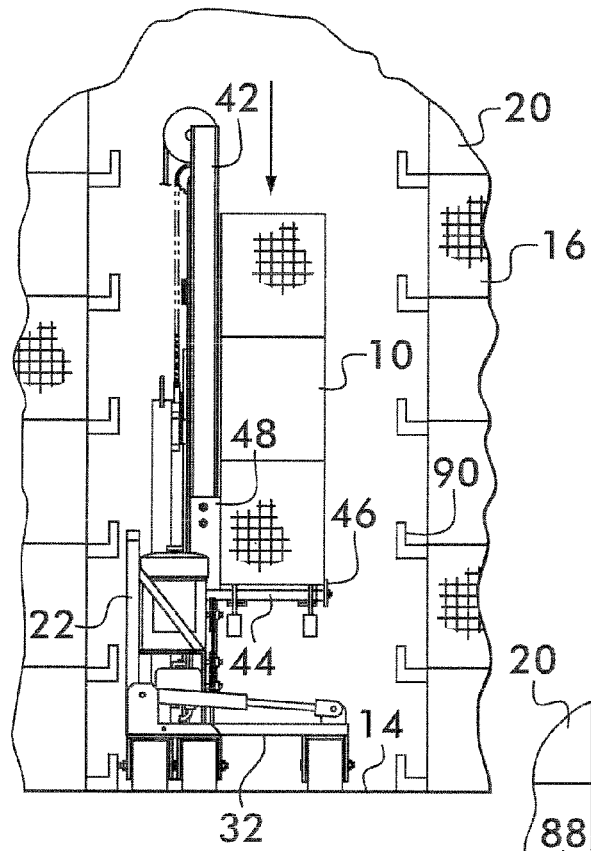
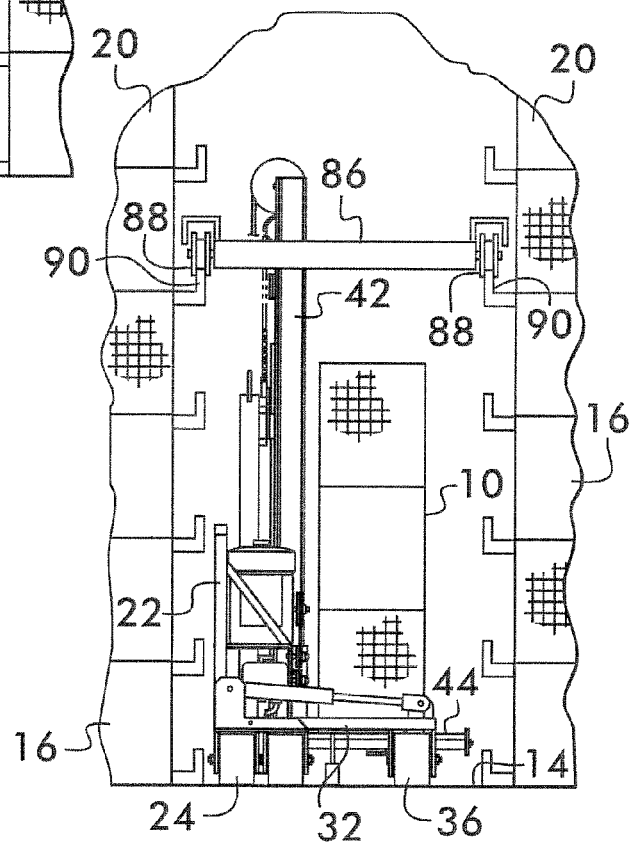

POULTRY CART HANDLER AND METHOD

BACKGROUND OF THE INVENTION

The present invention relates to handling poultry carts within poultry houses, and more particularly, the present invention relates to a portable handler for safely elevating poultry carts within narrow aisles of poultry houses.

Chicken and like poultry can be grown in high density cages within poultry houses. Merely for purposes of example, an average-sized poultry house may house about 85,000 to 100,000 live chickens. The high density cages are typically aligned in rows extending substantially the full length of the poultry house, and a narrow aisle, or walkway, is defined between each adjacent pair of rows of cages permitting access to the cages. As an example, an average-sized poultry house may have seven such aisles each being approximately 500 feet in length. The high density cages provide many stacked tiers of cages including upper tiers of cages elevated well above the floor of the aisle.

Chicken and like poultry are typically required to be relocated to and from various types of poultry houses, processing plants and the like. For example, chicks are typically permitted to grow for about eighteen weeks in a nursing house and are then relocated to a "layer" house for egg production and collection. At the end of the egg laying cycle, the chickens are relocated to processing plants. Transporting poultry to and from poultry houses and processing plants typically requires the poultry to be removed from cages and placed in mobile multi-compartmented poultry carts. Each cart may be designed to hold about 150 to 200 live chickens and may weigh approximately 600 to 800 pounds when fully loaded. Filling and/or emptying an average-sized poultry house typically requires the use of about 450 to 500 carts each of which must be loaded and/or unloaded and pushed throughout the length of the poultry house.

Simply for purposes of example, each mobile poultry cart may have a relatively rectangular frame supporting a few tiers of cages. The front and rear ends of each cart are typically supported on fixed and/or caster wheels. U.S. Pat. Nos. 4,084,714 issued to Williams and 3,895,727 issued to Rucker disclose examples of mobile poultry carts.

Due to the limited space available within the narrow aisles of poultry houses, the carts may be required to be manually pushed and/or pulled through the aisles of the poultry house. The manual handling of mobile poultry carts is both a labor intensive and potentially dangerous procedure considering the significant size, weight, and number of carts and the distance that they must be traversed. As an improvement with respect to manually pushing and/or pulling mobile poultry carts through the aisles of the poultry houses, U.S. Pat. No. 7,500,448 B1 issued to Melhorn discloses a self-propelled poultry cage handler for use in moving mobile poultry carts through the aisles of a poultry house.

An additional problem with respect to handling poultry carts within poultry houses is that high density cages within poultry houses include several tiers of cages that extend well above the floor of the poultry house which makes manual unloading of fully-grown chickens from the cages difficult. For example, when fully grown chicken are to be removed from the upper tiers of high density cages, a worker must climb up the structure provided by the high density cages, grasp several fully-grown chickens from an upper level cage, climb down the structure provided by the high density cages, and place the chickens within the mobile poultry cart positioned and supported on the floor of the aisle of the poultry house. The worker needs to repeat this process a tremendous amount of times to empty the upper tiers of cages throughout the poultry house. Thus, the manual emptying of high density cages is a labor intensive and potentially dangerous activity considering the number of cages that must be emptied, the height of the upper tiers of the high density cages above the floor of the poultry house, the need to carry several fully grown chicken while ascending from the upper tiers, and the significant number of cages that must be emptied and distance that must be traversed.

Accordingly, there is a need for an apparatus and method for handling poultry within the narrow confines of poultry houses. Preferably, the apparatus and method should enable safe and efficient unloading of fully-grown poultry from upper tiers of high density cages into mobile poultry carts within narrow aisles of poultry houses.

BRIEF SUMMARY OF THE INVENTION

According to the present invention, a cart-handler for handling mobile carts within narrow confines is provided. The cart-handler is constructed from a mobile elongate frame having at least one upright support rail and opposite ends supported on wheels enabling movement of the elongate frame along an underlying floor surface. A pair of stabilizers is connected to the frame. Each stabilizer is movable into a retracted position on the frame and into a laterally-extended position in which the stabilizer directly engages the underlying floor surface to aid in supporting the frame on the floor. One stabilizer is located at one end of the frame, and the other stabilizer is located at the opposite end of the frame. When the stabilizers are placed in the laterally-extended position, each stabilizer extends outward from a common or same side of the elongate frame. A cart-lifter is mounted on the support rail of the frame and is movable vertically along the support rail so that the cart-lifter can engage, elevate and support a separate mobile cart above the underlying floor surface.

According to another aspect of the present invention, a system for unloading poultry from upper tiers of high density cages in a poultry house is provided. The system includes at least one mobile poultry cart that is self-supportable on an underlying floor surface of a narrow aisle within the poultry house adjacent the high density cages and a separate self-propelled cart-handler for handling mobile poultry carts within the poultry house. The cart-handler has an elongate frame providing a narrow end-profile enabling the mobile poultry cart and the cart-handler to be positioned side-by-side and parallel within the narrow aisle of the poultry house. The elongate frame of the cart-handler has opposite ends supported on wheels enabling movement of the cart-handler along the underlying floor surface. The cart-handler includes a pair of stabilizers connected to the frame. Each stabilizer is retractable onto the frame and is extendable laterally from the frame into a position for direct engagement with the underlying floor surface. One stabilizer is located at one end of the frame and the other stabilizer is located at the opposite end of the frame. Each stabilizer is laterally-extendable from a common side (i.e., same side) of the elongate frame. The cart-handler also includes a cart-lifter which is mounted on an upright support rail of the frame and is movable upwardly along the support rail so that the cart-lifter is able to engage, elevate and support the mobile poultry cart entirely above the underlying floor surface and adjacent the upper tiers of the high density cages to facilitate unloading of poultry from the upper tiers of the high density cages into the mobile poultry cart.

According to a further aspect of the present invention, a method of unloading poultry from upper tiers of high density cages lining a narrow aisle in a poultry house is provided. A mobile, self-propelled, elongate cart-handler having a narrow end profile is positioned on the floor of the narrow aisle of the poultry house. The cart-handler has stabilizers in a retracted position and a cart-lifter in a stowed position. A separate, empty, mobile poultry cart is positioned parallel to, and in side-by-side relation with, the cart-handler on the floor in the narrow aisle adjacent lower tiers of the high density cages. After the positioning steps, the stabilizers of the cart-handler are laterally extended adjacent opposite ends of the cart-handler such that the stabilizers engage the floor within the narrow aisle with the mobile poultry cart being located therebetween. A gripping mechanism of the cart-lifter of the cart-handler is pivoted such that the gripping mechanism extends underneath the mobile poultry cart at a mid-section of the mobile poultry cart. The cart-lifter is raised to elevate the mobile poultry cart completely off the floor to an elevation adjacent the upper tiers of the high density cages. After the mobile poultry cart is raised, poultry is unloaded from the upper tiers of the high density cages into the elevated mobile poultry cart.

BRIEF DESCRIPTION OF THE DRAWINGS

The features and advantages of the present invention should become apparent from the following description when taken in conjunction with the accompanying drawings, in which:

FIG. 2A is a magnified view of a top section of the handler shown in FIG. 2;

FIG. 4 is a plan view of the portable poultry cart handler in a condition as shown in FIG. 1 (i.e., stabilizers and lifting mechanism in a retracted position);

FIG. 5 is a plan view of the portable poultry cart handler in a condition as shown in FIG. 3 (i.e., stabilizers and lifting mechanism in an extended/deployed position);

FIG. 8 is an elevational view of the end of a handler positioned within a narrow aisle formed by opposed rows of high density cages in a poultry house;

FIG. 9 is an elevational view of an end of a mobile poultry cart positioned essentially parallel to and adjacent the handler positioned within the narrow aisle foamed by high density cages in the poultry house;

FIG. 10 is an elevational view of the stabilizers and lifting mechanism of the handler in an extended/deployed position within the narrow aisle;

FIG. 11 is an elevational view of a mobile poultry cart gripped and supported by the handler and being elevated to a positioned above the floor of the poultry house such that the mobile poultry cart can be positioned adjacent upper tiers of the high density cages of the poultry house lining the aisle;

FIG. 12 is an elevational view of a mobile poultry cart gripped and supported by the handler and being lowered to the floor of the poultry house;

FIG. 13 is an elevational view of the stabilizers and lifting mechanism of the handler in an extended/deployed position within the narrow aisle and with mobile platforms for supporting workers adjacent upper tiers of the high density cages of the poultry house;

DETAILED DESCRIPTION OF THE INVENTION

Figure 1:
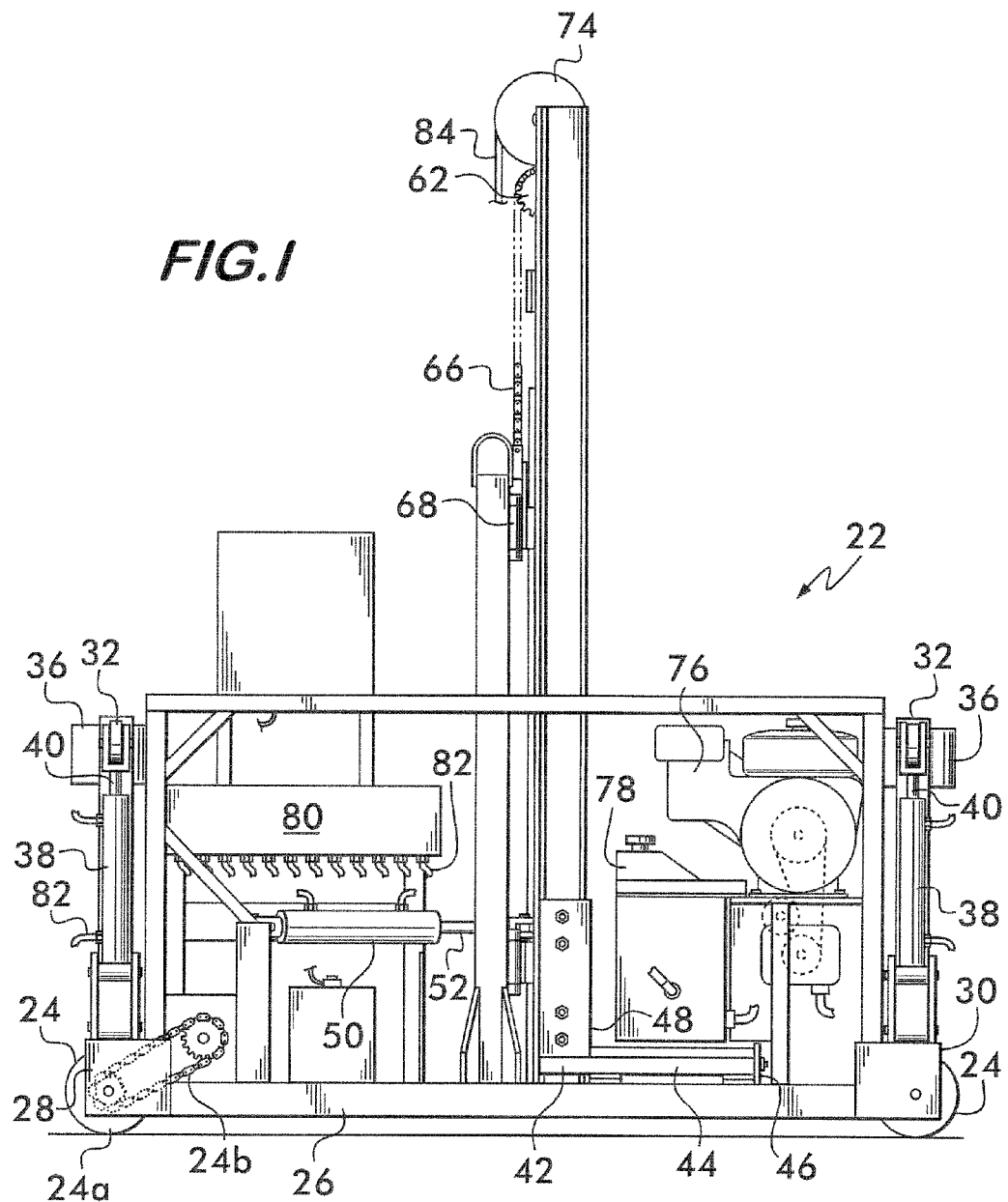
FIG. 1 is a rear elevational view of a portable poultry cart handler according to the present invention.

A multi-tiered, multi-compartmented portable mobile poultry cart 10 is often used to transport poultry within a poultry house 12 along long narrow aisles 14 lined by rows of high density cages 16 forming a permanent structure of the poultry house 12. For example, see cart 10 illustrated in FIG. 9. Typically, the mobile poultry cart 10 will have a substantially rectangular/elongate frame permitting it to pass through the narrow aisles 14 of the poultry house 12. The frame is supported on wheels 18 so that it can be pushed/pulled manually or otherwise through the narrow aisles 14 of the poultry house 12. The cart 10 is typically sized to hold about 150 to 200 live chickens and to weight about 600 to 800 lbs. when fully loaded.

With respect to unloading fully-grown live chicken from the upper tier 20 or upper tiers of the high density cages 16, it is conventional practice for a worker to manually climb up the side of the high density cages 16, open the door of the upper tier 20, grab several chicken by the neck, climb down the side of the high density cages 16, and manually place the chicken in the mobile poultry cart 10 which is located and supported on the floor of the aisle (for instance, as shown in FIG. 9). This is continued until the mobile poultry cart 10 is full. Thereafter, the mobile poultry cart 10 is wheeled down the aisle 14 and exits the poultry house to an intended destination. Another empty mobile poultry cart 10 is positioned in the aisle 14 and more chicken are removed from the high density cages 16, including from the upper tier 20, and this process is continued throughout the poultry house 12.

The present invention relates to a portable, mobile, self-propelled handler 22 enabling the above described poultry-unloading process to be efficiently and safely accomplished. As will be explained in greater detail below, the handler 22 has a relative elongate construction and has a relatively narrow width. For example, see the plan view of the handler 22 illustrated in FIG. 4. The narrow end profile is necessary since the aisles of poultry houses are relatively narrow; for instance, as shown in FIG. 9, the width of the aisle 14 may only be slightly more than double the width of the mobile poultry cart 10. Accordingly, the handler 22 has a length that is greater than the length of the mobile poultry cart 10 and a width that is no greater than the width of the mobile poultry cart 10.

The purpose of the handler 22 is to grip and lift the mobile poultry cart 10 as best shown in FIGS. 11 and 12 so that the cart 10 can be positioned adjacent an upper tier 20 of the high density cages 16 within a narrow aisle 14 of the poultry house 12. In this way, a worker can climb up the structure provided by the high density cages 16, grasp several fully-grown chicken, and place the chicken directly within the cart 10 without having to climb down the high density cages 16 and then without having to re-climb up the high density cages 16.

Rather, the worker is merely positioned adjacent the upper tiers 20 and need not climb down until the upper tiers 20 are emptied.

The handler 22 as best shown in FIGS. 1, 2, 4, 8 and 9 and be placed in a compact condition in which the handler 22 provides a relatively-narrow end profile thereby permitting the portable handler 22 to be easily propelled through the narrow aisles 14 of poultry houses 12. As shown in FIG. 1, the handler 22 has front and rear wheels 24 and can be self-propelled via a motor, engine or the like 76 mounted on a frame 26 of the handler 22. By way of example, a drive wheel 24a may be powered via drive chain 24b by a motor powered by gasoline or like energy source such as propane contained in a tank 78 or the like supported on the frame 26 of the handler 22.

An operator can walk behind the handler 22 as it is propelled by rotating action of the drive wheel 24a. Controls located on a control panel (not shown) can enable the operator to control the speed and direction of movement of the handler 22 as well as other operations to be discussed. The control panel (not shown) may be mounted in a fixed position on an end of the handler 22 or may be provided as a hand held controller (not shown) tethered to the handler 22 via a wire or the like or may be a wireless remote controller (not shown).

Accordingly, the handler 22 is portable and can be self-propelled to any location within the poultry house 12 and is sufficiently narrow to traverse the narrow aisles 14 of poultry houses 12. The narrow profile of the handler 22 is also required to permit a mobile poultry cart 10 to be positioned directly and closely alongside the handler 22 and substantially parallel to the handler 22 within the aisle 14. For example, as best shown in FIG. 8, when the handler 22 is an a compact condition, the handler 22 takes up about less than half of the width of the aisle 14 thereby permitting a cart 10 to be positioned on the side of the handler 22 or to be wheeled past the handler 22.

Figure 2:
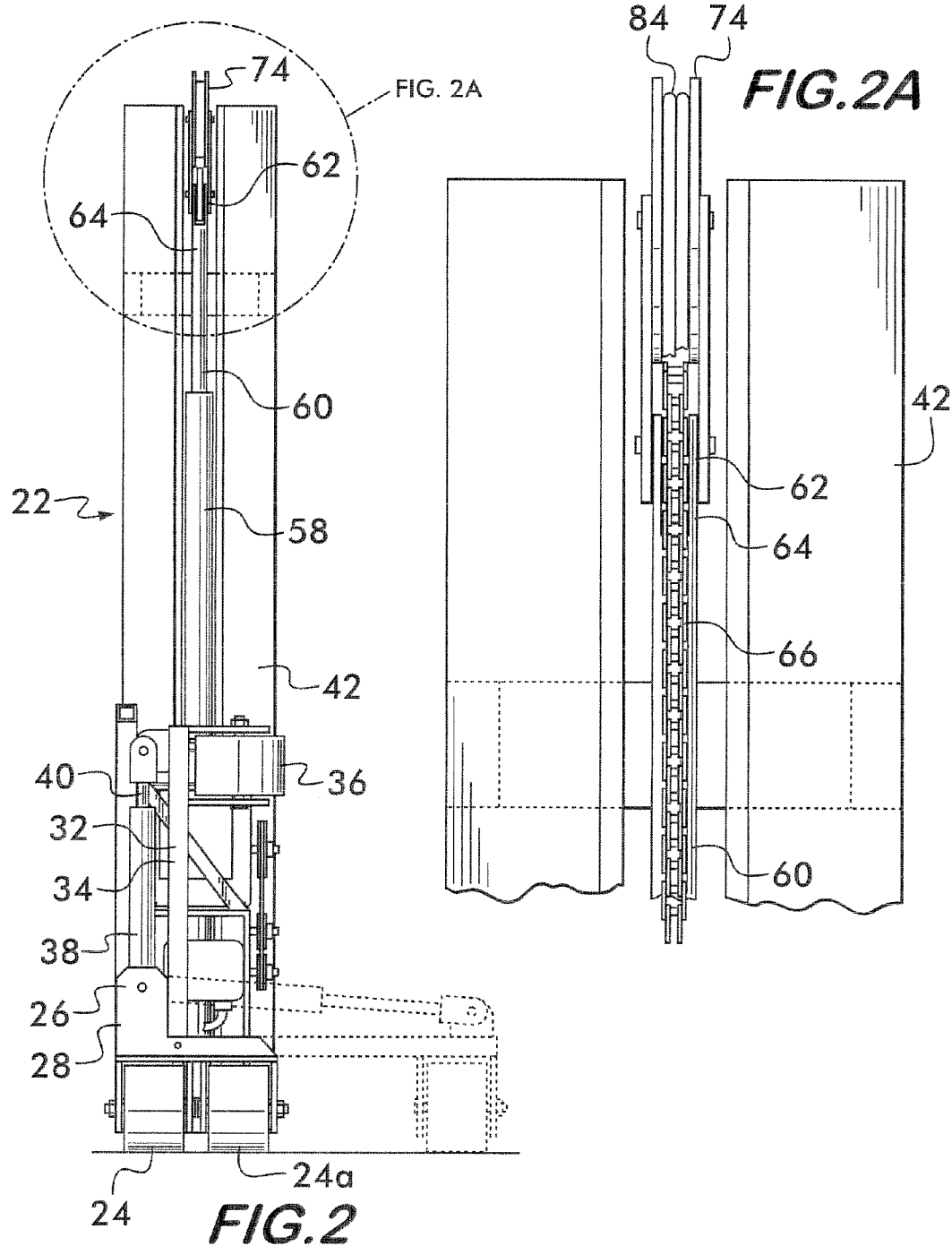
FIG. 2 is a side elevational view of the portable poultry cart handler shown in FIG. 1 with stabilizers in a retracted position and a lifting mechanism in a retracted position.

As best shown in FIG. 4, the elongate handler 22 has opposite ends 28 and 30. A retractable and laterally-deployable stabilizer 32 is mounted at each end, 28 and 30, of the handler 22. As shown in FIGS. 1 and 2, the stabilizers 32 are in a retracted position permitting the end profile of the handler 22 to be relatively narrow as discussed above. For example, see FIGS. 8 and 9.

Figure 3:
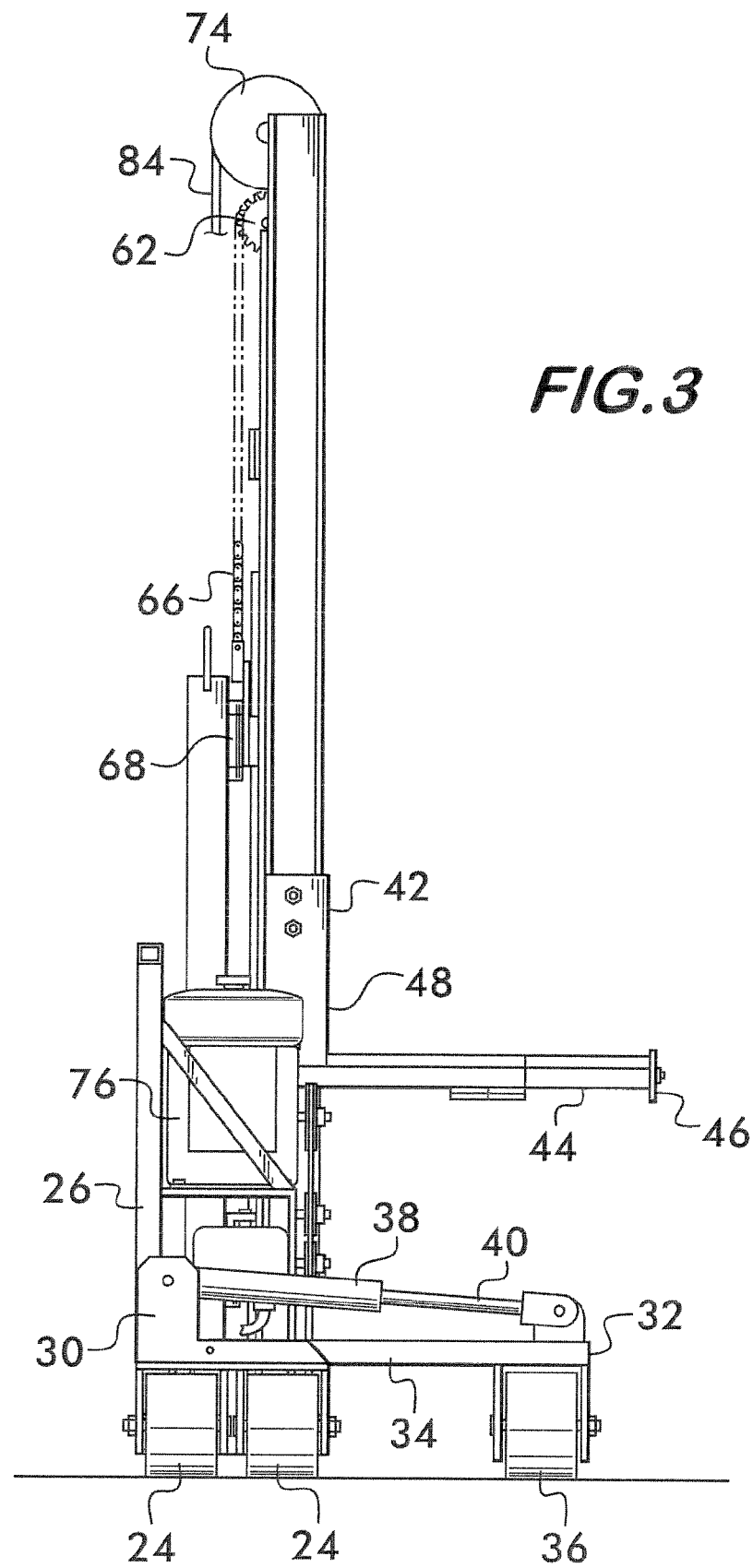
FIG. 3 is a side elevational view of the portable poultry cart handler as shown in FIG. 2 except with the stabilizers deployed in a laterally-extended position and the lifting mechanism in an extended and elevated position.

Each stabilizer 32 has an arm 34 that is connected to and pivots relative to the frame 26 of the handler 22 between a vertical position shown in FIG. 2 and a horizontal position shown in FIG. 3. A wheel 36 is located at a free end of the arm 34 such that when the arm 34 is in an extended position as illustrated in FIG. 3, the wheel 36 is supported on the floor of the poultry house 12. Also, see FIGS. 10-12.

As best illustrated by comparing the position of the stabilizers 32 shown in FIGS. 9 and 10, a mobile poultry cart 10 can only be positioned adjacent and parallel to the handler 22 in the narrow aisle 14 when the stabilizers 32 are in a retracted position with the arms 34 extending upright. However, when the stabilizers 32 are extended laterally as shown in FIG. 10 and the wheels 36 of the stabilizers 32 are supported on the floor, the handler 22 and stabilizers 32 extend almost the complete width of the narrow aisle 14 and prevent passage of a mobile poultry cart 10 past the handler 22.

The purpose of the stabilizers 32 is to stabilize and support the handler 22 on the floor of the poultry house 12 as the handler 22 lifts and elevates a mobile poultry cart 10, for instance as shown in FIGS. 11 and 12, to an elevation completely above the floor. These carts 10 are relatively heavy, especially when partly or fully loaded with fully-grown chicken, and the stabilizers 32 must prevent the handler 22 from tipping over and crashing into an adjacent row of high density cages 16. The wheels 24 and 36 permit the handler 22 to be propelled along the aisle 14 as the cart 10 is in an elevated position. Thus, as chicken are progressively unloaded from the upper tier 20 of the high density cages 16, the handler 22 and elevated cart 10 can be advanced along the aisle 14 via operation of the drive wheel 24a controlled by an operator.

For purposes of extending and retracting the arms 34 of the stabilizers 32, each stabilizer 32 can have a hydraulically or pneumatically operated cylinder or vessel 38 and piston or rod 40. In FIG. 2, the rod 40 is fully retracted into the cylinder 38 and thus the 34 is caused to extend in a generally upright position. As the rod 40 is extended from the cylinder 38, the arm 34 is caused to pivot relative to frame 26 into a laterally-extended position. For example, see FIG. 3. In this position, the cylinder/piston arrangement, 38 and 40, holds the stabilizers 32 in the deployed position and prevents the stabilizer 32 from retracting until the cart 10 is intended to be lowered onto the floor. In the illustrated embodiment, a housing 80 for hydraulic valve bodies and electronic solenoids is mounted on the frame 26 of the cart-handler 22 and interconnects to the cylinder 38 via associated tubing 82.

The handler 22 also includes a cart-lifter 42 that is used to grip a mobile poultry cart 10 and then lift the cart 10 to an elevation adjacent upper tiers 20 of high density cages 16 within a narrow aisle 14. As best shown by comparing FIGS. 4 and 5, the lifter 42 can be positioned in a stowed position as shown in FIG. 4 and can be pivoted relative to the frame 26 into a position in which a gripping assembly 44 of the lifter 42 extends laterally of the handler 22 directly between the stabilizers 32. For example, see FIG. 5. The significance of such positioning is best illustrated by comparing FIGS. 9 and 10. In FIG. 9, the lifter 42 is in a stowed position and permits the end profile of the handler 22 to be relatively narrow. In contrast, after a cart 10 has been positioned alongside the handler 22 within a narrow aisle 14, the stabilizers 32 can be extended beyond both ends of the cart 10 and the lifter 42 can be pivoted such that the gripping assembly 44 extends underneath the mobile poultry cart 10 at essentially a mid-point of the cart 10.

Figure 6:
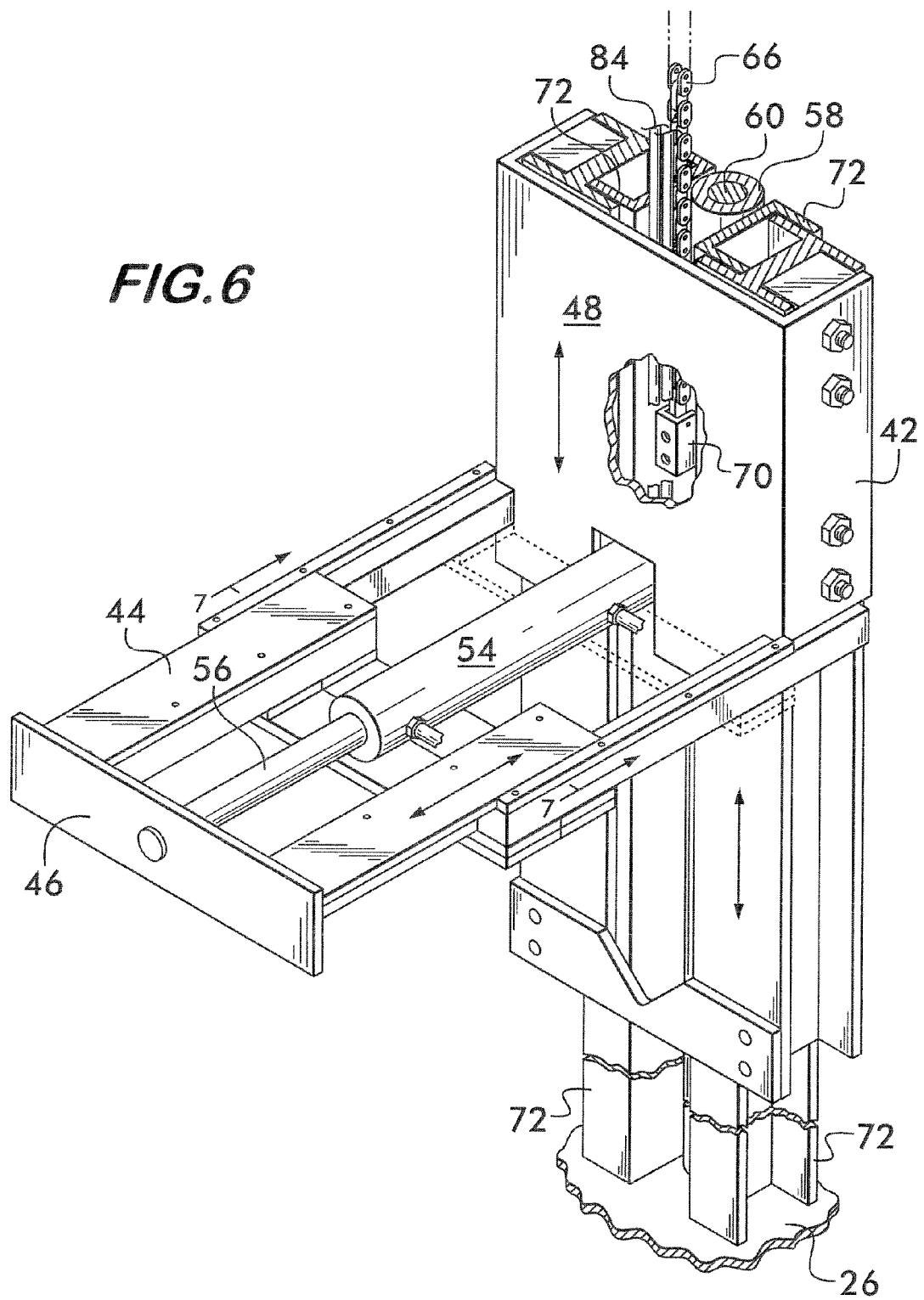
FIG. 6 is a prospective view of a base of the lifting mechanism.
Figure 7:
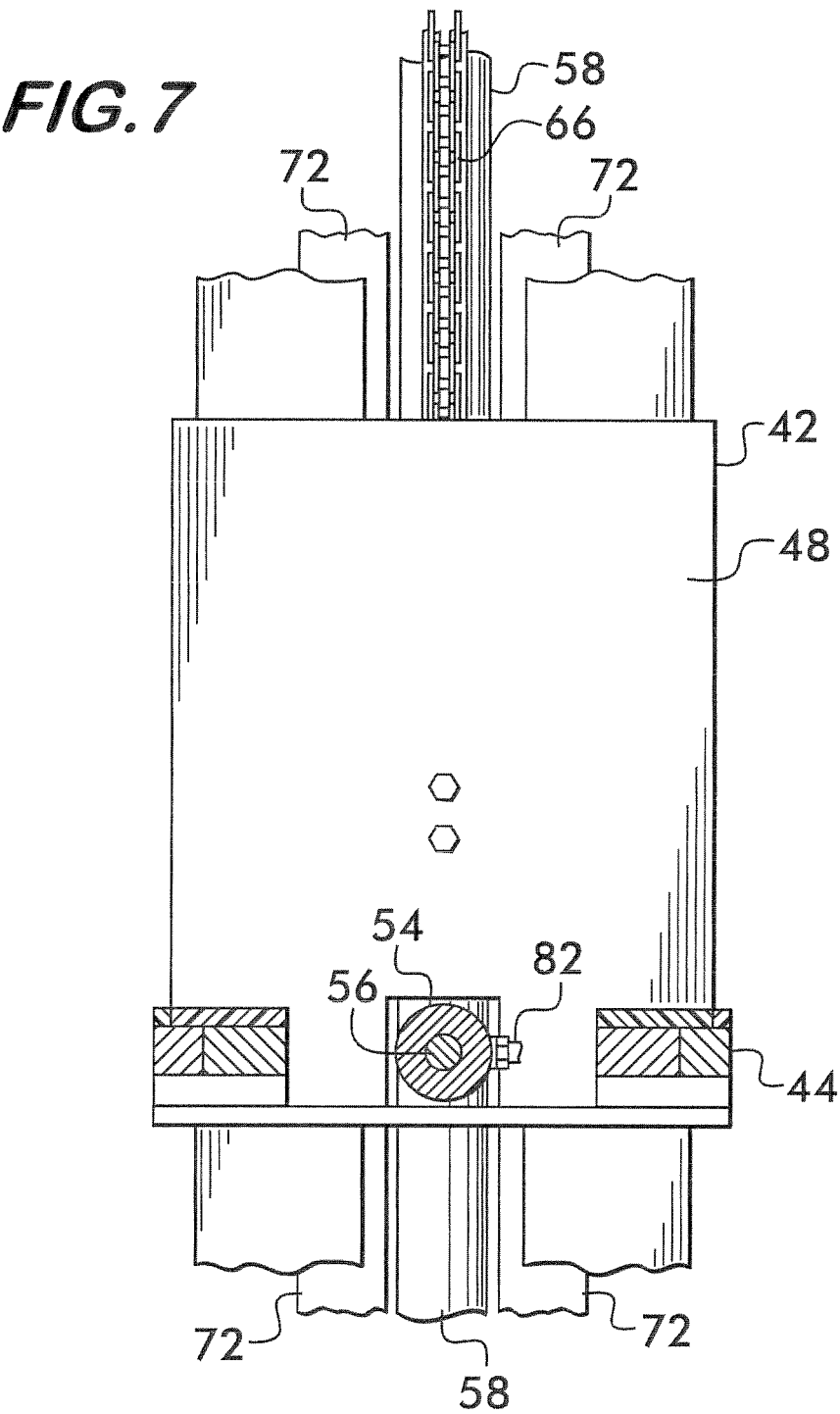
FIG. 7 is a cross-sectional view of the lifting mechanism along line 7-7 of FIG. 6.

After the gripping assembly 44 is extended to a position underneath the cart 10, the gripping assembly can be slightly elevated to engage the underside of the cart 10 and then can be slightly retracted such that the gripping assembly 44 clamps the cart 10 between a vertically-extending free end clamping wall 46 of the gripping assembly 44 and a vertically-extending support wall 48 of the lifter 42. For example, see FIG. 6.

For purposes of pivoting the lifter 42 including gripping assembly 44 relative to frame 26, a hydraulically or pneumatically operated cylinder or vessel 50 and piston or rod 52 can be used. As best shown in FIG. 4, the rod 52 is fully extended from the cylinder 50 and thus, the lifter 42 is caused to be located in a stowed position. However, as the rod 52 is retracted into the cylinder 50, the lifter 42 is caused to pivot relative to frame 26 into the deployed position shown in FIG. 5 in which the gripping assembly 44 extends laterally from the side of the handler 22. For example, see FIG. 3. In this position, the cylinder/piston arrangement, 50 and 52, holds the lifter 42 in the deployed position and prevents the lifter 42 from pivoting relative to the frame 26.

The gripping assembly 44 can also include a hydraulically or pneumatically operated cylinder or vessel 54 and piston or rod 56 to control its operation. As best shown in FIG. 5, the rod 56 is retracted into the cylinder vessel 54 and thus, the free end clamping-wall 46 is relatively closely spaced to the support wall 48. However, as the rod 56 is extended from the cylinder vessel 54, the gripping assembly 44 expands to accommodate the full width of a mobile poultry cart 10. For example, see FIG. 6 and FIG. 10. When the gripping assembly 44 is in contact with the underside of the cart 10, the gripping assembly 44 can be caused to retract such that the base of the cart is clamped between the free end clamping wall 46 and support wall 48.

For purposes of elevating the cart 10, the entire lifter 42 can be extended vertically upward such that the cart 10 gripped by the gripping assembly 44 is lifted to an elevated position above the floor. See FIG. 11. After the lifter 42 is rotated or pivoted into the deployed position as shown in FIGS. 3 and 10, the lifter 42 including the gripping assembly 44 can be elevated into engagement with the cart 10. As best shown in FIG. 2, a hydraulically or pneumatically operated cylinder or vessel 58 and piston or rod 60 can be used to elevate the lifter 42. For example, when the piston 60 is retracted into the vertically-extending cylinder 58, the lifter 42 is positioned at its lowermost position enabling the lifter 42 to be pivoted to a stowed position or enabling the gripping assembly 44 to be extended underneath a mid-section of a cart 10. However, when the piston 60 is extended from the cylinder 58, the lifter 42 including the gripping assembly 44 is moved upwardly away from the frame 26 and floor. This lifts the cart 10 off the floor and such that the cart 10 can be elevated to a position substantially adjacent the upper tiers 20 of the high density cages 16. See FIGS. 3 and 11.

For purposes of further stabilizing the handler 22 during a cart-lifting operation, a sprocket wheel 62 can be mounted to an upper end 64 of the vertically-extending piston rod 60. The sprocket wheel 64 engages a chain link 66 having opposite ends, 68 and 70. One of the ends 68 of the chain 66 is secured to the frame 26 in a stationary position relative to the frame 26, and the opposite end 70 is secured to the lifter 42 and moves with the lifter 42 when the lifter is raised or lowered.

The lifter 42 is supported for vertical movement along a pair of stationary upright support rails 72 extending from the frame 26. The support rails 72 define a longitudinal axis about which the support rails 72 and lifter 42 is pivoted or rotated between the stowed position and the deployed position. As the lifter 42 is moved upward along the height of the support rails 72, the sprocket wheel 64 and chain end 70 is moved therewith. Thus, as the lifter 42 is raised and/or lowered, the sprocket wheel 64 rotates and the length of the chain 66 on opposite sides of the sprocket wheel 64 changes. However, the chain 66 remains taut throughout the movement of the lifter 42 thereby stabilizing the movement of the lifter 42 and helping support the weight of the cart 10.

As best illustrated in FIG. 2A, a reel 74 is mounted to the upper end of piston 60 above the sprocket wheel 64. The reel 74 carries lengths of a pair of hydraulic hoses 84 wound thereon. The hydraulic hoses 84 have ends connected to the valve/solenoid assembly 80 and ends connected to the hydraulically-operated cylinder 58. Thus, as the lifter 42 is elevated relative to the frame 26, the reel 74 rotates and permits additional lengths of the hydraulic hoses 84 to extend from the reel 74 and accommodate for the changing height of the lifter 42. As the lifter 42 is lowered, the hoses 84 retract onto the reel 74 and therefore do not provide an obstacle to operation or use of the handler 22.

Thus, as explained above, the operator uses a control panel to control movement of the handler 22 along the aisle 14 and to control operation of the stabilizers 32 and lifter 42 including the gripping mechanism 44.

A method of handling carts 10 according to the present invention includes a step of positioning the handler 22 in an aisle 14 adjacent high density cages 16. See FIG. 8. The handler 22 should be in a compact position permitting a cart 10 to be positioned side-by-side and parallel to the handler 22 as shown in FIG. 9. The stabilizers 32 can then be deployed such that they extend adjacent each end of the cart 10, and the lifter 42 can be pivoted into a position in which the gripping assembly 44 can be extended underneath the base of the cart 10. See FIG. 10. Thereafter, the lifter 42 can be slightly elevated such that the gripping assembly 44 engages the base of the cart 10, and then the gripping assembly 44 can be slightly retracted to clamp onto the cart 10. With the cart 10 gripped by the gripping assembly 44, the cart 10 can then be elevated by causing the lifter 42 to be elevated relative to the frame 26 of the handler 22. See FIG. 11.

With the cart 10 lifted near the upper tiers 20 of the high density cages 16 of the poultry house 12, a worker can climb to the upper tiers 20 and begin removing fully-grown poultry from the upper tiers 20 and loading the poultry into the elevated mobile poultry cart 10. If needed, the handler 22 with the elevated cart 10 can be moved along the floor of the aisle 14 so that the cart 10 remains in close vicinity to the worker for ease in unloading/loading poultry. When the cart 10 is full, the lifter 42 can be lowered to return the cart 10 to the floor. At this point, the gripping assembly 44 can be disengaged from the cart 10 and retracted, the lifter 42 can be pivoted into a stowed position, and the stabilizers 32 can be retracted. Thereafter, the cart 10 is free to be wheeled away from the handler 22 and the next empty cart 10 can be positioned adjacent the handler 22 for subsequent lifting.

Figure 14:
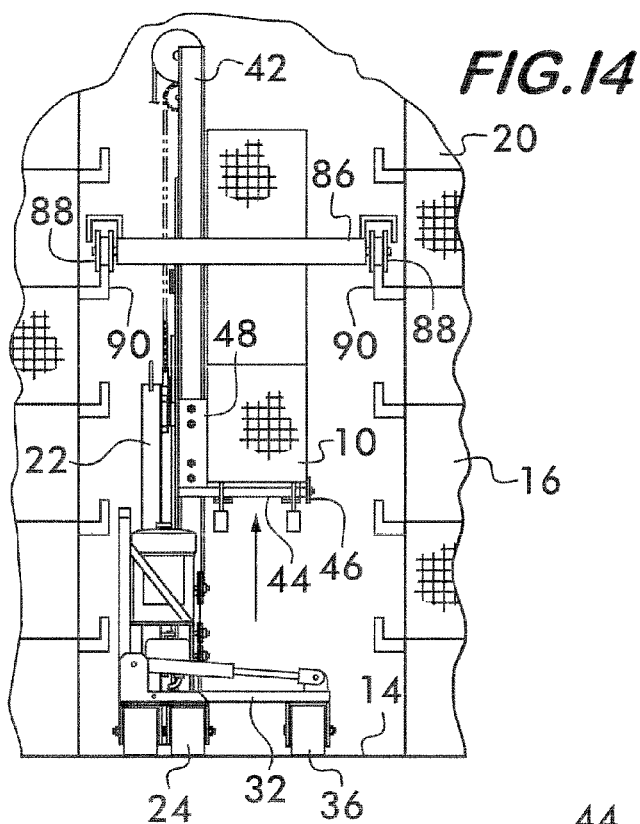
FIG. 14 is an elevational view of a mobile poultry cart gripped and supported by the handler and being elevated to a positioned above the floor of the poultry house such that the mobile poultry cart can be positioned adjacent upper tiers of the high density cages of the poultry house lining the aisle and adjacent and between a pair of mobile platforms capable of supporting workers.
Figure 15:
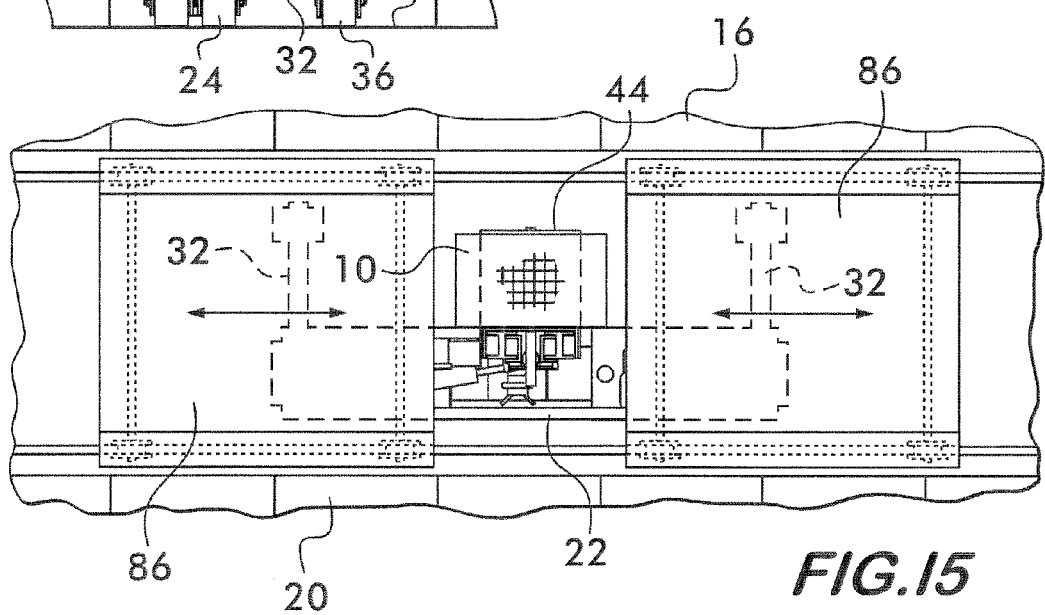
FIG. 15 is a plan view showing a pair of spaced-apart platforms for supporting workers.

As best illustrated in FIGS. 13-15, the handler 22 can also include a pair of mobile platforms 86 that can be used to provide workers a convenient position to stand when unloading chicken from the upper tiers 20 of cages 16. Without such platforms 86, workers in the past have simply straddled the aisle 14 with legs spread apart with one foot on cages 16 on opposite sides of the aisle 14. To provide greater comfort, maneuverability, and safety, the handler 22 can be equipped with at least one mobile platform 86, preferably a pair of mobile platforms 86, on which a worker can be supported at a desired elevation above the floor of the aisle 14.

Each work platform 86 has a set of wheels 88 or the like that ride on and are engaged to raised side edge walls 90 of feeder troughs of the cages 16. Thus, the work platforms 86 are supported by the feeder troughs which form "rails" for the platforms 86 to ride along the length of the aisle 14. One platform 86 can be located adjacent each of the ends of the handler 22 such that an opening 92 is provided therebetween to permit the cart 10 to be lifted between the pair of platforms 86. One worker can be positioned on each platform 86 for simultaneously loading chicken into opposite ends of a lifted cart 10. For ease of illustration purposes, the size of the cart 10 shown in FIG. 15 has been reduced. However, typically the length of the cart 10 may be only slightly less than the spacing between the stabilizers 32 of the handler 22.

The work platforms 86 are connected or tethered to the handler 22 for purposes of maintaining proper spacing and for purposes of moving the work platforms 86 with the handler 22 as the handler 22 is advanced along the length of the aisle 14. Thus, straps, bars, or the like can be used to connect the platforms 86 to the handler 22 and/or to each other.

While preferred handlers/lifters and methods have been described in detail, various modifications, alternations, and changes may be made without departing from the spirit and scope of the handler and method according to the present invention as defined in the appended claims.

The invention claimed is:

1. A cart-handler for handling mobile carts within narrow confines, comprising:

a mobile elongate frame with opposite ends supported on wheels enabling movement of said elongate frame along an underlying floor surface, said frame having at least one upright support rail;

a pair of stabilizers connected to said frame, each stabilizer being movable into a retracted position on said frame and into a laterally-extended position in which said stabilizer directly engages the underlying floor surface to support said frame thereon, one of said stabilizers being located at one of said ends of said frame and the other of said stabilizers being located at the other of said ends of said frame, and, in said laterally-extended position, each of said stabilizers extending outwardly from a common side of said elongate frame; and a cart-lifter mounted on said support rail and movable upwardly along said support rail for engaging, elevating and supporting a separate mobile cart above said underlying floor surface, wherein said cart-lifter includes a gripping assembly extending laterally relative to said upright support rail, said gripping assembly being laterally extendable and retractable so as to be able to extend underneath a cart and clamp onto a base of the cart before the cart is elevated by said cart-lifter; and further wherein said support rail is mounted on said frame in a manner enabling said support rail to rotate relative to said frame about a longitudinal axis of said support rail such that said cart lifter and gripping assembly are positionable between a stowed position on said frame and deployed position in which said gripping assembly extends laterally from said common side of said frame at a central location between said pair of stabilizers.

2. A cart-handler according to claim 1, wherein said cart-lifter is adapted for use in elevating a mobile poultry cart within narrow confines of aisles adjacent high density cages within a poultry house to elevate the mobile poultry cart to a position adjacent upper tiers of cages of the high density cages for purposes of facilitating unloading of fully-grown poultry from the upper tiers of cages; and wherein said cart handler is interconnected to at least one mobile work platform that is supported on and rides along the cages at an elevation above a floor of the aisle.

3. A cart-handler according to claim 1, wherein each of said stabilizers includes an arm having an end section attached to said frame in a manner enabling said arm to pivot relative to said frame and an opposite free end section having a wheel connected thereto which engages the underlying floor surface when said stabilizer is laterally-extended from said frame so that said frame is moveable on the underlying floor surface when said stabilizers are laterally-extended from said frame.

4. A cart-handler according to claim 3, wherein, when each of said stabilizers is retracted onto said frame, said arm of each of said stabilizers extends substantially upright from said frame.

5. A cart-handler according to claim 1, wherein said cart-lifter is movable upwardly along said support rail with a vertically-disposed hydraulically-operated cylinder and rod assembly.

6. A cart-handler according to claim 5, wherein said rod assembly is extendable and retractable relative to said cylinder and has an upper end on which a sprocket wheel is mounted, and wherein a chain with one end connected to said cart-lifter and an opposite end connected to said frame extends over said sprocket wheel to stabilize movement of said cart-lifter relative to said frame during raising and lowering of said cart lifter.

7. A cart-handler according to claim 1, wherein said frame is self-propelled, and wherein, when said stabilizers are retracted and said cart-lifter is in said stowed position, said elongate frame has a relatively narrow profile enabling a mobile cart to be positioned parallel and closely to said common side of said elongate frame despite said elongate frame and mobile cart being located in narrow confines.

8. A system for unloading poultry from upper tiers of high density cages in a poultry house, comprising:

at least one mobile poultry cart self-supportable on an underlying floor surface of a narrow aisle within the poultry house adjacent the high density cages; and a separate, self-propelled cart-handler for handling mobile poultry carts;

said cart-handler having an elongate frame providing a narrow end-profile enabling said mobile poultry cart and said cart-handler to be positioned side-by-side and parallel within the narrow aisle;

said elongate frame of said cart-handler having opposite ends supported on wheels enabling movement of said cart-handler along the underlying floor surface, and said frame including at least one upright support rail;

said cart-handler including a pair of stabilizers connected to said frame, each stabilizer being retractable onto said frame and being extendable laterally from said frame into a position for direct engagement with the underlying floor surface, one of said stabilizers being located at one of said ends of said frame and the other of said stabilizers being located at the other of said ends of said frame, and each of said stabilizers being laterally-extendable from a common side of said elongate frame; and said cart-handler including a cart-lifter mounted on said support rail and movable upwardly along said support rail so that said cart-lifter is able to engage, elevate and support said mobile poultry cart entirely above said underlying floor surface and adjacent the upper tiers of the high density cages to facilitate unloading of poultry from the upper tiers of the high density cages into said mobile poultry cart, wherein said cart-lifter includes a gripping assembly extending laterally relative to said support rail, and wherein said gripping assembly is laterally extendable and retractable so as to be able to extend underneath said mobile poultry cart and clamp onto a base of said mobile poultry cart before being elevated by said cart-lifter; and wherein said support rail is mounted on said frame in a manner enabling said support rail to rotate relative to said frame about a longitudinal axis of said support rail such that said cart lifter and gripping assembly are movable between a stowed position in which said gripping assembly extends on said frame and a deployed position in which said gripping assembly extends laterally from said common side of said elongate frame at a central location between said pair of stabilizers.

9. A system according to claim 8, wherein, when said stabilizers are retracted and said cart-lifter is in said stowed position, said relatively narrow profile enables said mobile poultry cart to be positioned parallel and closely to said common side of said elongate frame despite said elongate frame and mobile poultry cart being located in narrow confines of said aisle.

10. A system according to claim 9, wherein each of said stabilizers includes an arm having an end section attached to said frame in a manner enabling said arm to pivot relative to said frame and an opposite free end section having a wheel connected thereto which engages the underlying floor surface when said stabilizer is laterally-extended from said frame so that said frame is moveable on the underlying floor surface when said stabilizers are laterally-extended from said frame.

11. A system according to claim 10, wherein said cart-lifter is movable upwardly along said support rail with a vertically-disposed hydraulically-operated cylinder having a rod extendable and retractable relative to said cylinder, wherein said rod has an upper end on which a sprocket wheel is mounted, and wherein a chain with one end connected to said cart-lifter and another end connected to said frame extends over said sprocket wheel and stabilizes movement of said cart-lifter relative to said frame as said cart-lifter moves up and down said support rail.

12. A system according to claim 8, further comprising at least one mobile work platform which is supported on the cages and tethered or connected to said cart-handler such that movement of said cart-handler along the aisle causes movement of the work platform along the aisle.

13. A method of unloading poultry from upper tiers of high density cages lining a narrow aisle in a poultry house, comprising:
    positioning a mobile, self-propelled, elongate cart-handler having a narrow end profile on the floor of the narrow aisle of the poultry house, the cart-handler having stabilizers in a retracted position and a cart-lifter in a stowed position;
    positioning a separate, empty, mobile poultry cart parallel to, and in side-by-side relation with, the cart-handler on the floor in the narrow aisle adjacent lower tiers of the high density cages;
    after said positioning steps, laterally-extending the stabilizers adjacent opposite ends of the cart-handler such that the stabilizers engage the floor within the narrow aisle with the mobile poultry cart being located therebetween and pivoting a gripping mechanism of the cart-lifter such that the gripping mechanism extends underneath the mobile poultry cart at a mid-section of the mobile poultry cart;
    raising the cart-lifter to elevate the mobile poultry cart completely off the floor to an elevation adjacent the upper tiers of the high density cages; and
    after said raising step, unloading poultry from the upper tiers of the high density cages into the elevated mobile poultry cart.

14. A method according to claim 13, further comprising the steps of extending the gripping assembly underneath the mobile poultry cart, slightly raising the cart-lifter such that the gripping assembly engages a base of the mobile poultry cart, and then retracting the gripping assembly until the gripping assembly clamps onto the base of the mobile poultry cart to positively hold the mobile poultry cart during said raising step.

15. A method according to claim 13, further comprising the steps of lowering the mobile poultry cart onto the floor of the aisle after said unloading step, retracting said stabilizers and retracting said cart-lifter to said stowed position to provide clearance for wheeling the loaded mobile poultry cart away from the cart-handler and for positioning another empty mobile poultry cart next to the cart-handler.

16. A method according to claim 13, further comprising the steps of propelling the cart-handler on wheels along the aisle during said unloading step while the mobile poultry cart is elevated by said cart-lifter, and interconnecting at least one mobile work platform supported on the cages and extending across the aisle to the cart-handler such that movement of the cart-handler along the aisle results in movement of the mobile work platform along the aisle.

* * * * *